(12) United States Patent
Koroly et al.

(10) Patent No.: US 12,428,764 B2
(45) Date of Patent: Sep. 30, 2025

(54) SYSTEMS AND METHODS FOR NON-LINEAR THROUGH THICKNESS REINFORCEMENT

(71) Applicant: ROHR, INC., Chula Vista, CA (US)

(72) Inventors: Christopher C. Koroly, Spring Valley, CA (US); Katherine E. Waugh, San Diego, CA (US); Vijay V. Pujar, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 349 days.

(21) Appl. No.: 18/317,034

(22) Filed: May 12, 2023

(65) Prior Publication Data

US 2024/0376652 A1     Nov. 14, 2024

(51) Int. Cl.
*D04H 18/02*     (2012.01)
*B32B 5/06*     (2006.01)

(52) U.S. Cl.
CPC ............. *D04H 18/02* (2013.01); *B32B 5/06* (2013.01)

(58) Field of Classification Search
CPC .......... D04H 18/02; D04H 1/46; D04H 3/102; D04H 3/105; D04H 13/005; D04H 18/00; D04H 1/485; D04H 1/488; D04H 1/52; D04H 3/115; D04H 5/02; D05B 55/08; D05B 85/06; D05C 11/02; D05C 11/06; D05C 15/10; D05C 15/12; A61B 2017/06076; A61B 2017/0608; B29C 70/24; B67B 7/0405
USPC ...................... 112/80.4, 470.11, 222; 28/115
See application file for complete search history.

(56) References Cited

U.S. PATENT DOCUMENTS

| | | | |
|---|---|---|---|
| 2,004,709 A | 6/1935 | Phillips | |
| 2,930,100 A | 3/1960 | Rust, Jr. | |
| 3,348,993 A | 10/1967 | Sissons | |
| 3,476,636 A | 11/1969 | Crosby | |
| 3,488,250 A * | 1/1970 | Zocher | D04H 18/02 28/115 |
| 3,506,530 A | 4/1970 | Crosby | |

(Continued)

FOREIGN PATENT DOCUMENTS

| | | |
|---|---|---|
| AT | 399733 B | 7/1995 |
| CN | 103710885 | 4/2014 |

(Continued)

OTHER PUBLICATIONS

USPTO; Requirement for Restriction dated Jun. 12, 2024 in U.S. Appl. No. 18/317,016.

(Continued)

*Primary Examiner* — Amy Vanatta
(74) *Attorney, Agent, or Firm* — SNELL & WILMER L.L.P.

(57) ABSTRACT

Systems and methods for through thickness reinforcement of a fibrous preform include a needle configured to move a through thickness fiber along a curved path. The needle can be moved along the curved path and can penetrate one or more plies of the fibrous preform. The needle can move one or more through thickness fibers along the curved path (e.g., from a first ply of the fibrous preform at least partially into a second ply of the fibrous preform). The needle can be moved about one or more axes during through thickness reinforcement. In various embodiments, the needle is translated along an axis, and rotated about the same axis to move the through thickness fiber(s) along the curved path.

9 Claims, 9 Drawing Sheets

(56) References Cited

U.S. PATENT DOCUMENTS

| | | | |
|---|---|---|---|
| 3,605,223 A | | 9/1971 | Barth |
| 3,725,984 A | | 4/1973 | Graber |
| 3,994,762 A | | 11/1976 | Wrzesien |
| 4,030,170 A | * | 6/1977 | Eckhardt ............... D04H 18/02 28/115 |
| 4,341,829 A | | 7/1982 | Gold |
| 4,891,870 A | | 1/1990 | Muller |
| 5,095,833 A | * | 3/1992 | Darrieux ............... D04H 3/07 112/412 |
| 5,226,217 A | | 7/1993 | Olry |
| 5,350,615 A | | 9/1994 | Darrieux |
| 5,511,294 A | * | 4/1996 | Fehrer ............... D04H 18/02 28/107 |
| 5,699,596 A | * | 12/1997 | Fehrer ............... D04H 18/02 28/115 |
| 6,183,583 B1 | | 2/2001 | Duval et al. |
| 6,360,412 B1 | | 3/2002 | Duval |
| 6,767,602 B1 | | 7/2004 | Duval et al. |
| 7,430,790 B1 | | 10/2008 | Bowles et al. |
| 10,578,115 B2 | | 3/2020 | Ander et al. |
| 10,612,189 B2 | | 4/2020 | Wagner et al. |
| 11,491,741 B2 | | 11/2022 | Hamlyn et al. |
| 2002/0038499 A1 | * | 4/2002 | Fehrer ............... D02G 3/36 28/247 |
| 2006/0288549 A1 | | 12/2006 | Jean |
| 2013/0045654 A1 | | 2/2013 | von der Fecht |
| 2014/0121581 A1 | | 5/2014 | Richardson |
| 2016/0007993 A1 | * | 1/2016 | Smith ............... A61B 17/0401 606/145 |
| 2017/0135692 A1 | * | 5/2017 | Belson ............ A61B 17/06166 |
| 2018/0274144 A1 | | 9/2018 | Evrard |

FOREIGN PATENT DOCUMENTS

| | | | | |
|---|---|---|---|---|
| CN | 114561750 | | 5/2022 | |
| CN | 115094575 A | * | 9/2022 | ............ D04H 18/02 |
| CN | 116657334 A | | 8/2023 | |
| CN | 116219643 B | | 6/2024 | |
| DE | 102011016755 | | 10/2012 | |
| EP | 0767265 | | 4/1997 | |
| EP | 1132511 | | 9/2001 | |
| EP | 2339055 | | 6/2011 | |
| GB | 1384144 | | 2/1975 | |
| GB | 2250519 | | 6/1992 | |
| GB | 2462534 | | 2/2010 | |
| KR | 940005369 B1 | * | 6/1994 | ............ D05C 11/06 |
| KR | 20240008657 | | 1/2024 | |
| WO | 2013190221 | | 12/2013 | |

OTHER PUBLICATIONS

European Patent Office, European Search Report dated Oct. 8, 2024 in Application No. 24174932.4.

European Patent Office, European Search Report dated Oct. 8, 2024 in Application No. 24174756.7.

USPTO; Non-Final Office Action dated Sep. 30, 2024 in U.S. Appl. No. 18/317,016.

Xiaoming Chen et al: "Robot needle-punching path planning for complex surface preforms" Robotics and Computer-Integrated Manufacturing, vol. 52, Aug. 1, 2018, pp. 24-34, ISSN 0736-5845, https://doi.org/10.1016/j.rcim.2018.02.004.

USPTO; Notice of Allowance dated Jan. 30, 2025 in U.S. Appl. No. 18/317,016.

* cited by examiner

SYSTEMS AND METHODS FOR NON-LINEAR THROUGH THICKNESS REINFORCEMENT

FIELD

The present disclosure relates generally to the manufacture of carbon/carbon composites, and, more particularly, to through thickness reinforcement of fibrous preforms for such manufacture.

BACKGROUND

Through thickness reinforced composites (i.e., composites with fibers inserted into the through thickness (or z-) direction of the laminate) generally provide higher interlaminar properties but lower in-plane properties compared to 2D lay-ups. One such example of through thickness reinforcement is needling, where in-plane fibers are moved to turn in the out-of-plane direction into the thickness of the preform using a needling process. Alternative through-thickness reinforcement methods include stitching, tufting, and others that are known to those skilled in the art, which insert a fiber filament (or similar) into the through thickness direction.

SUMMARY

An apparatus for through thickness reinforcement of a fibrous preform is disclosed, in accordance with various embodiments. The apparatus comprises an end effector and a curved needle extending from the end effector in a first direction, wherein the curved needle is configured to rotate about a first axis parallel to the first direction. The end effector is configured to move the curved needle in the first direction as the curved needle rotates about the first axis to move a through thickness fiber along a curved path from a first ply of the fibrous preform at least partially into a second ply of the fibrous preform.

In various embodiments, the curved needle is configured to rotate about the first axis in a first rotational direction while the through thickness fiber is moved along the curved path, and the curved needle is configured to rotate about the first axis in a second rotational direction to remove the curved needle from the fibrous preform, wherein the first rotational direction is opposite the second rotational direction.

In various embodiments, the apparatus further comprises an electric motor mounted to the end effector and configured to rotate the needle about the first axis parallel to the first direction.

In various embodiments, the apparatus further comprises a robotic arm, wherein the end effector is mounted to the robotic arm, and the robotic arm is configured to rotate the end effector about a second axis to move the through thickness fiber along the curved path.

In various embodiments, the second axis is perpendicular to the first axis.

In various embodiments, the curved needle comprises a barb on a curved portion of the curved needle.

In various embodiments, the curved needle comprises a linear portion extending from the end effector and a curved portion extending from the linear portion and defining a tip of the curved needle. In various embodiments, the curved portion comprises a helical geometry.

In various embodiments, the curved needle comprises a linear portion extending from the end effector and a curved portion extending from the linear portion and defining a tip of the curved needle.

A method for through thickness reinforcement of a fibrous preform is disclosed, in accordance with various embodiments. In various embodiments, the method comprises moving a curved needle along a first axis which is normal to a surface of the fibrous preform, rotating the curved needle in a first rotational direction about a central axis as the curved needle is moved along the first axis, and moving a through thickness fiber with the curved needle along a curved path from a first ply of the fibrous preform at least partially into a second ply of the fibrous preform.

In various embodiments, the method further comprises rotating the curved needle about a second axis as the curved needle is moved along the first axis to move the through thickness fiber along the curved path.

In various embodiments, the method further comprises rotating the curved needle in a second rotational direction about the central axis to remove the curved needle from the fibrous preform.

In various embodiments, the method further comprises activating an electric motor to rotate the curved needle.

In various embodiments, moving the curved needle along the first axis which is normal to the surface of the fibrous preform comprises linearly translating the curved needle along the first axis.

In various embodiments, the central axis and the first axis are coaxial.

In various embodiments, moving the through thickness fiber with the curved needle along the curved path comprises positioning the through thickness fiber to extend along a direction having an in-plane component and a through thickness component.

A method for through thickness reinforcement of a fibrous preform is disclosed, in accordance with various embodiments. In various embodiments, the method comprises moving a needle along a curved path, penetrating a first ply of the fibrous preform and a second ply of the fibrous preform with the needle as the needle is moved along the curved path, and moving a first through thickness fiber with the needle along the curved path from the first ply of the fibrous preform at least partially into the second ply of the fibrous preform.

In various embodiments, the method further comprises rotating the needle about a central axis of the needle to move the needle along the curved path.

In various embodiments, the needle is curved.

In various embodiments, the method further comprises moving a second through thickness fiber with the needle along a second curved path from the first ply of the fibrous preform at least partially into the second ply of the fibrous preform. In various embodiments, the method further comprises interlocking the second through thickness fiber with the first through thickness fiber.

A fibrous preform is disclosed, comprising in-plane fibers, and a first through thickness reinforcement fiber, wherein the first through thickness reinforcement fiber is oriented at a first angle with respect to the in-plane fibers. The first through thickness reinforcement fiber is disposed along a first non-linear path.

In various embodiments, the fibrous preform further comprises a second through thickness reinforcement fiber, wherein the second through thickness reinforcement fiber is oriented at a second angle with respect to the in-plane fibers, wherein the second through thickness reinforcement fiber is disposed along a second non-linear path.

In various embodiments, the fibrous preform further comprises a plurality of through thickness reinforcement fibers including the first through thickness reinforcement fiber, wherein each through thickness reinforcement fiber of the plurality of through thickness reinforcement fibers is oriented at a non-zero angle with respect to the in-plane fibers, wherein at least one of a density or an angle of the plurality of through thickness reinforcement fibers varies along the fibrous preform.

In various embodiments, the fibrous preform further comprises a plurality of through thickness reinforcement fibers including the first through thickness reinforcement fiber, wherein each through thickness reinforcement fiber of the plurality of through thickness reinforcement fibers is oriented at a non-zero angle with respect to the in-plane fibers, wherein the plurality of through thickness reinforcement fibers further comprises a second through thickness reinforcement fiber disposed adjacent the first through thickness reinforcement fiber, the second through thickness reinforcement fiber is oriented at a second angle with respect to the in-plane fibers, and the first through thickness reinforcement fiber and the second through thickness reinforcement fiber interlock with one another.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
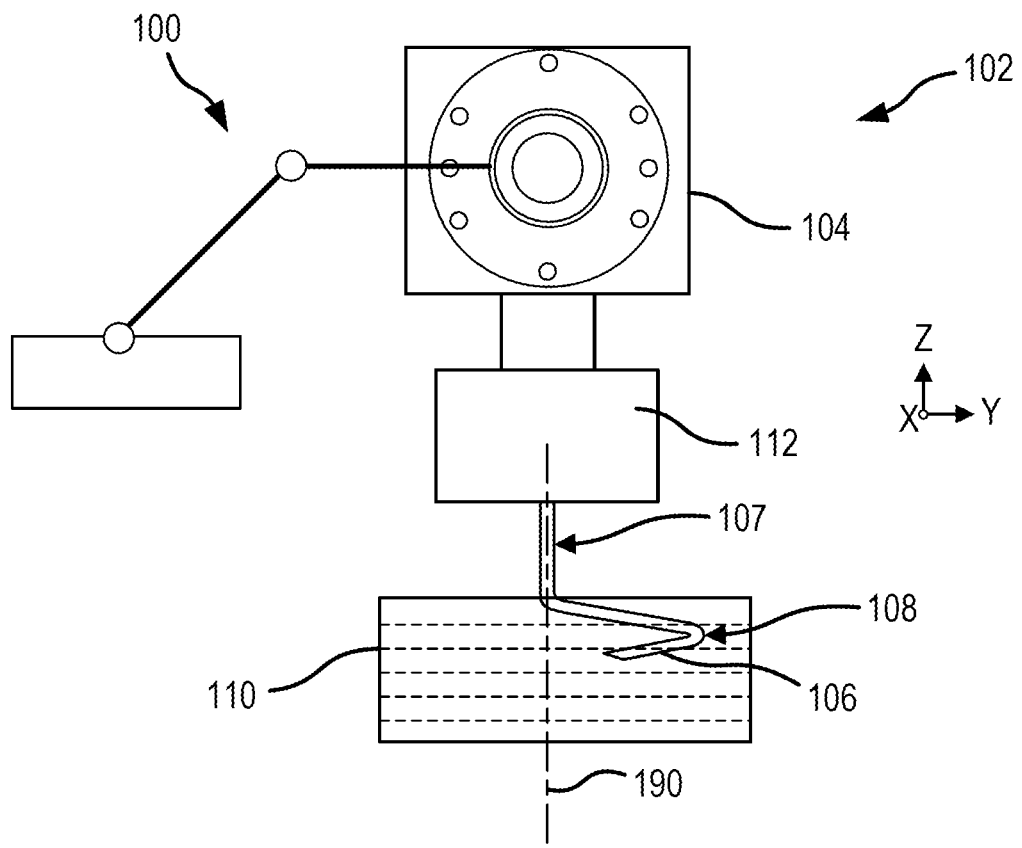
FIG. 1 is a schematic illustration of an exemplary robotic arm comprising a through thickness reinforcement apparatus during a through thickness reinforcement procedure, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Carbon-carbon composites having undergone through thickness reinforcement (sometimes referred to as 2.5D carbon-carbon composites) provide higher interlaminar properties but lower in-plane properties compared to 2D lay-ups (i.e., layups that have not undergone through thickness reinforcement). Some composite structures for aerospace applications have complex contours to meet aerodynamic and thermal requirements. Additionally, it is sometimes desirable for the structures to withstand in-plane and interlaminar stresses, which may vary across the structure.

The present disclosure provides systems and methods for through thickness reinforcement of fibrous preforms with tailored in-plane and interlaminar properties. Through thickness reinforcement can include punching or penetrating the fibrous preform using textile needles. Textile needles may include small barbs to efficiently transport fibers in the through-thickness direction of the fibrous preform. In various embodiments, textile needles may include small eyes (in some cases, in addition to small barbs) to transport a fiber filament in the through-thickness direction of the fibrous preform.

The present disclosure provides systems and methods to insert through thickness fibers (sometimes referred to as z-fibers) into a fiber ply-stack. The present disclosure provides systems and methods to needle regions of a fibrous preform with multi-axis (rather than linear) actuation to tailor interlaminar and/or in-plane properties. A needle/needling head can rotate about the Z axis while plunging into the fibrous preform. The needle can be helical/spiral-like in profile. The needle can plunge through the preform in a largely vertical motion while rotating about the axis of rotation. This would tend to enable the needles to more gently grab through thickness fibers and pull them in the through-thickness direction, thereby damaging the in-plane fiber less than in other needling applications.

Systems and methods of the present disclosure tend to minimize the reduction in in-plane properties while offering interlaminar property improvements, in accordance with various embodiments. By needling in a curve along the XY-plane, systems and methods of the present disclosure tend to reduce the anisotropy of in-plane properties in the needled regions and/or improve in-plane shear properties, in accordance with various embodiments.

With reference to FIG. 1, a through thickness reinforcement apparatus 102 is illustrated comprising an end effector 104 and a needle 106 (also referred to herein as a curved needle) mounted to the end effector 104 for through thickness reinforcement of a fibrous preform 110, in accordance with various embodiments. The end effector 104 can be mounted to a robotic arm 100 for articulating the needle 106 during through thickness reinforcement. The robotic arm 100 is schematically illustrated in FIG. 1 for ease of illustration and can be moveable along one or more axis for articulating the end effector 104. Through thickness reinforcement apparatus 102 can be placed over a fibrous ply stack (also referred to herein as a fibrous preform) for performing through thickness reinforcement to the ply stack. Robotic arm 100 may be configured to move the apparatus 102 with respect to the fibrous preform in a controlled manner to perform through thickness reinforcement, such as Z-needling. Z-needling refers to a process comprising penetrating a composite material (e.g., the fibrous preform) with needles and moving (e.g., by pulling or pushing) fibers from the in-plane direction and forcing them into the Z direction, where the "Z direction" as used herein refers to a direction perpendicular to the in-plane direction. For preforms having curved surfaces, the "Z-direction" refers to the direction normal to a (local) surface of the fibrous preform at the point where the preform is being needled (i.e., a direction normal to the tangent plane to the surface at the point of needling). In general, the Z-needling process has the effect of interlocking individual fabric layers together. The same effect may also be achieved by stitching or tufting, known to those skilled in the art to comprise inserting a fiber filament into the through-thickness direction. Thus, after through thickness reinforcement, the fibrous material has fibers extending in three different directions (i.e., in the X and Y directions in the plane of the fibrous layers and the Z direction perpendicular to the fibrous layers). It should be appreciated that through thickness reinforcement, as used herein, includes moving through thickness fibers in a direction at an angle to the in-plane direction, such as 90° (i.e., the Z-direction); though through thickness fibers can be oriented at any non-zero angle with respect to the in-plane direction (e.g., at an angle of between 1° and 90° with respect to the in-plane direction).

Figure 3:
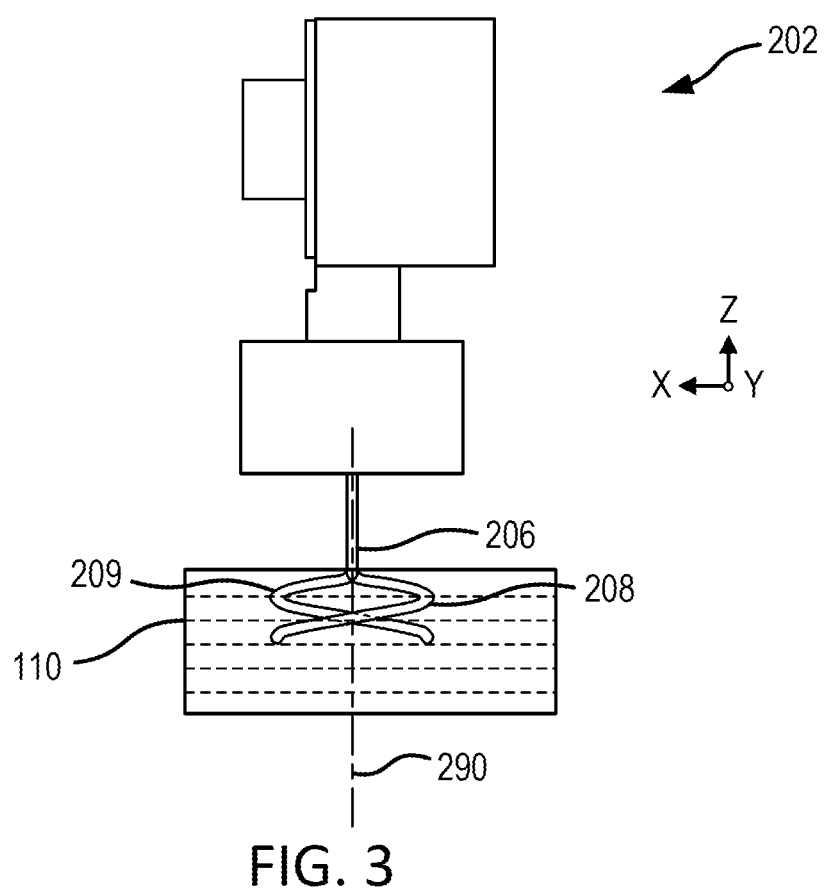
FIG. 3 is a schematic illustration of an exemplary through thickness reinforcement apparatus during a through thickness reinforcement procedure and having a curved needle defining a double helical geometry, in accordance with various embodiments.

In various embodiments, needle 106 extends from end effector 104 in a first direction (e.g., the negative Z-direction in FIG. 1). Needle 106 can include a linear portion 107 extending from the end effector 104 and a curved portion 108 extending from the linear portion 107 and defining a tip of the needle 106. The curved portion 108 can comprise a curved geometry. The curved portion 108 can be bent around two or more axes (e.g., around the X axis, the Y axis, and/or the Z axis). In various embodiments, the curved portion 108 comprises a helical geometry and/or a double helical geometry. For example, FIG. 3 illustrates an apparatus 202 comprising a needle 206 having a first curved portion 208 and a second curved portion 209. The first curved portion 208 and the second curved portion 209 can be bent around an axis 290 (also referred to herein as a needle axis or a central axis). The first curved portion 208 can define a first helical geometry and the second curved portion 209 can define a second helical geometry.

Figure 2:
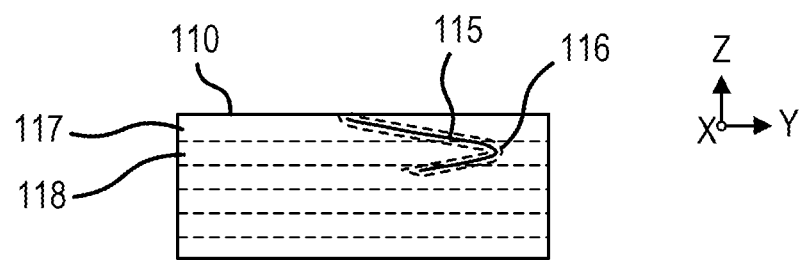
FIG. 2 is a schematic illustration of the fibrous preform of FIG. 1 after through thickness reinforcement and having a through thickness fiber extending along a curved path, in accordance with various embodiments.

With reference again to FIG. 1, the apparatus 102 may further comprise an electric motor 112 mounted to end effector 104. Electric motor 112 can be configured to spin or rotate needle 106 about axis 190 during through thickness reinforcement. Needle 106 can be moved along the Z-direction (i.e., in the negative Z-direction in FIG. 1) to move a through thickness fiber 115 (see FIG. 2) along a curved path 116 (illustrated by dashed lines in FIG. 2) from a first ply 117 of fibrous preform 110 at least partially into a second ply 118 of fibrous preform 110. In various embodiments, needle 106 is translated in the negative Z-direction and simultaneously rotated about axis 190 to move through thickness fiber 115 along the curved path 116. Needle 106 can be rotated about axis 190 in a first rotational direction and moved in the negative Z-direction to penetrate the fibrous preform 110 and can be rotated in a second (i.e., opposite) rotational direction and moved in the positive Z-direction to remove needle 106 from fibrous preform 110.

In various embodiments, axis 190 remains parallel to the Z-direction during through thickness reinforcement. Stated differently, needle 106 may translate only along the Z-direction (and rotated about axis 190) during through thickness reinforcement; though in various embodiments, needle 106 may translate and/or rotate about other axes during through thickness reinforcement, as described herein. In various embodiments, the rotational speed and/or translation speed of needle 106 can be chosen based upon the angle of curvature of needle 106 so that the needle 106 does not undesirably tear or damage fibrous preform 110. In various embodiments, the movement of end effector 104 (e.g., by robotic arm 100) and rotational speed of needle 106 can be choreographed using one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like.

Fibrous preform 110 may comprise a plurality of plies or layers. Each layer of material may share a common (e.g., the same) construction and/or material makeup. Each layer of material, for example, may be formed by a sheet/layer of fibrous material; e.g., woven carbon fiber, woven oxidized polyacrylonitrile (PAN) fibers, non-crimp fabric, etc. One or more or all the layers of material may each be impregnated with a polymer matrix; e.g., thermoset material or thermoplastic material. One or more or all of the layers of material may each be unimpregnated (e.g., only include the fibrous material) where, for example, the preform material is impregnated subsequent to formation of the composite structure. The method of the present disclosure, however, is not limited to such exemplary layer materials.

Figure 4:
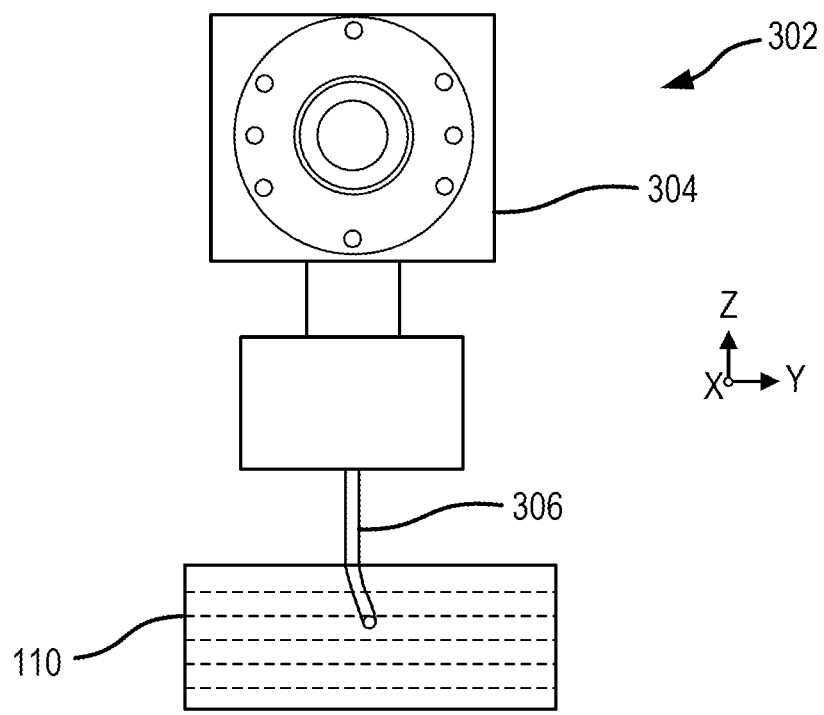
FIG. 4 is a schematic illustration of an exemplary through thickness reinforcement apparatus during a through thickness reinforcement procedure and having a curved needle, in accordance with various embodiments.

With reference to FIG. 4, a through thickness reinforcement apparatus 302 is illustrated comprising an end effector 304 and a needle 306 (also referred to herein as a curved needle) mounted to the end effector 304 for through thickness reinforcement of a fibrous preform 110, in accordance with various embodiments. Apparatus 302 may be similar to apparatus 102 as described herein with respect to FIG. 1, except that needle 306 comprises a different geometry from that of needle 106 (see FIG. 1). In various embodiments, needle 306 comprises a curved geometry. Needle 306 can comprise an arc type geometry. The needle 306 can be bent about an in-plane axis (e.g., the X-axis) that is oriented at a non-zero angle (e.g., 90°) with respect to the Z-direction. In various embodiments, needle 306 is bent around a single axis. In various embodiments, needle 306 is bent around more than one axis (e.g., the X axis and the Z axis).

Figure 5:
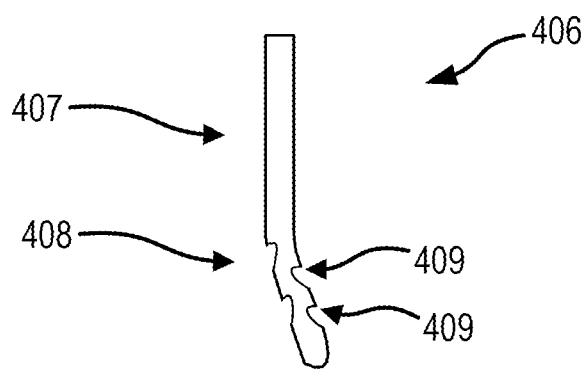
FIG. 5 is a perspective illustration of an exemplary curved needle having a linear portion and a curved portion with barbs disposed on the curved portion, in accordance with various embodiments.

With reference to FIG. 5, a needle 406 is illustrated comprising a linear portion 407, a curved portion 408, and one or more barbs 409 disposed on the curved portion. Barbs 409 can be configured to catch through thickness fibers in a top ply of the fibrous preform and push or pull the through thickness fibers in a direction at a non-zero angle with respect to the in-plane direction of the preform (i.e., in a through thickness direction) for through thickness reinforcement and/or to interlock adjacent plies of the preform to improve interlaminar and/or in-plane properties of the composite component.

Figure 6A:
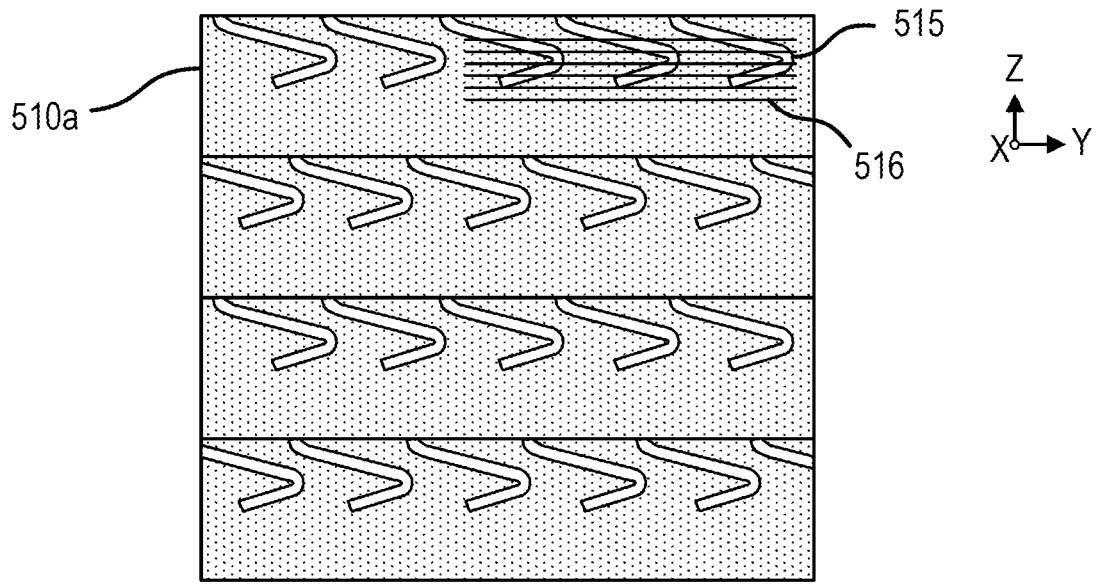
FIG. 6A, FIG. 6B, FIG. 6C, FIG. 6D, FIG. 6E, FIG. 6F, and FIG. 6G are schematic illustrations of through thickness fibers generated using a through thickness reinforcement apparatus of the present disclosure, in accordance with various embodiments.

With reference to FIG. 6A, through thickness fibers 515 are illustrated oriented along curved paths through a fibrous preform 510a, in accordance with various embodiments. In various embodiments, through thickness fibers 515 are non-interlocking (e.g., the through thickness fibers can all extend in a similar direction such that they do not overlap or have the propensity to become entangled with one another. Through thickness fibers 515 are oriented at an angle with respect to the in-plane fibers 516 which extend generally along the length of the fibrous preform 510a (i.e., in the Y-direction).

Figure 6B:
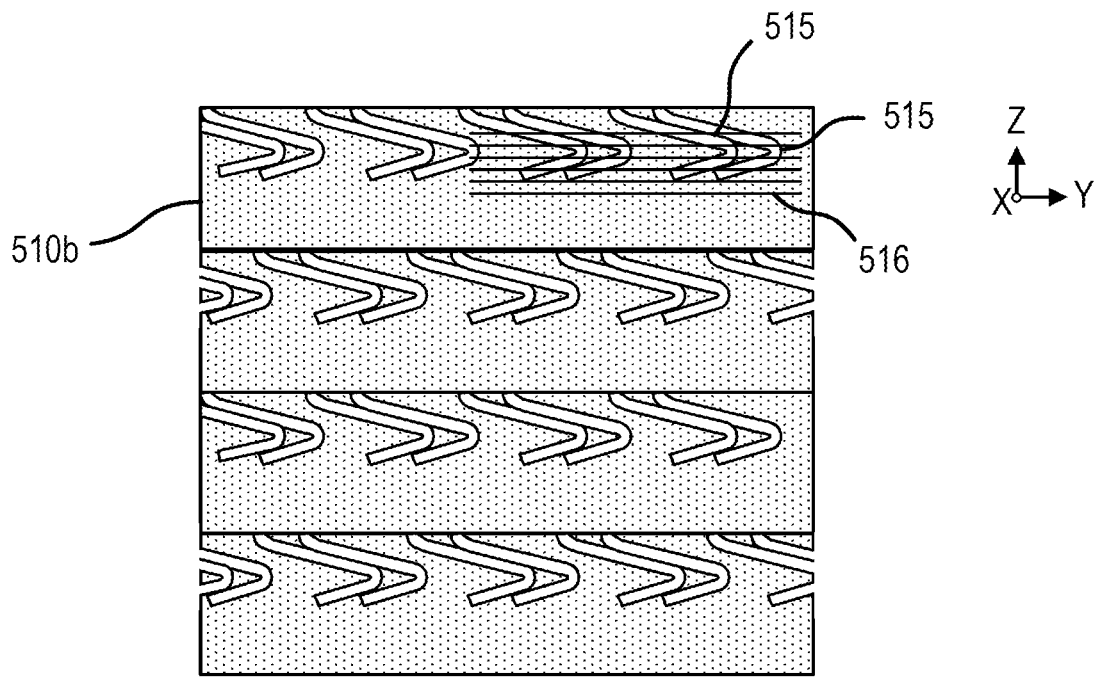
Figure 6C:
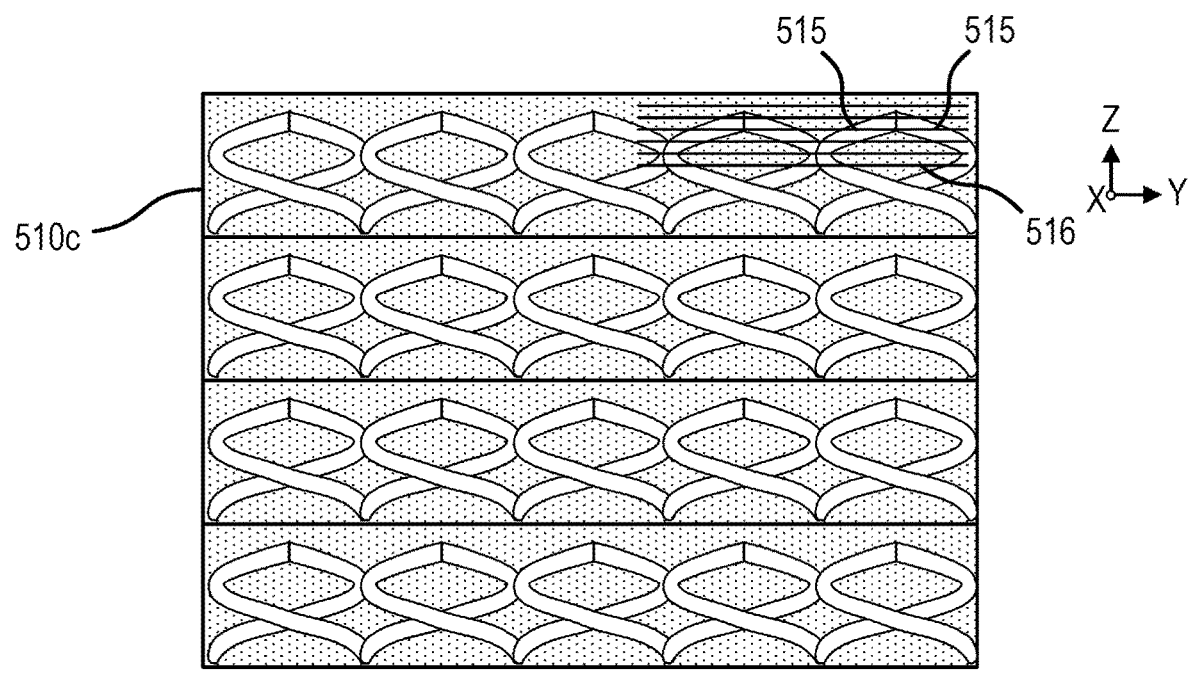
Figure 6D:
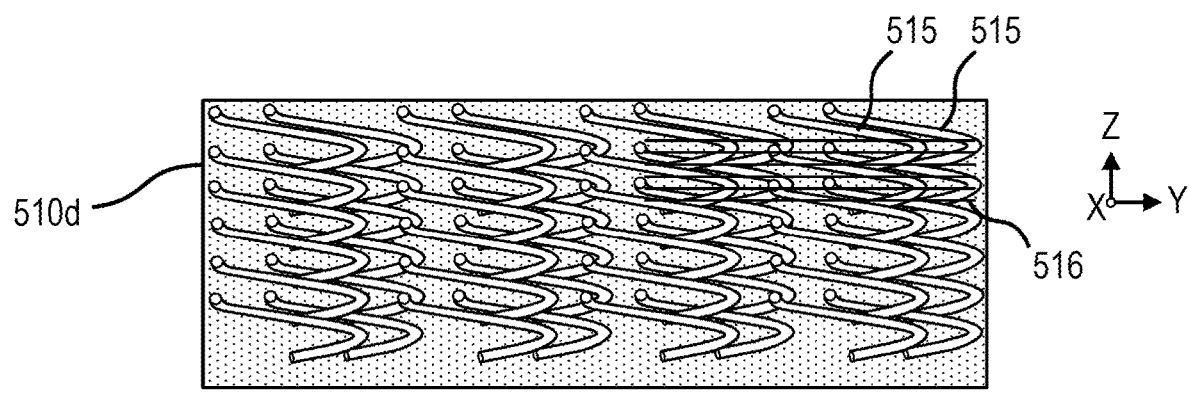

With reference to FIG. 6B, through thickness fibers 515 are illustrated oriented along curved paths through a fibrous preform 510b, in accordance with various embodiments. With reference to FIG. 6C, through thickness fibers 515 are illustrated oriented along curved paths through a fibrous preform 510c, in accordance with various embodiments. FIG. 6C illustrates through thickness fibers 515 oriented in a double helix pattern with through thickness fiber pairs extending in opposite rotational directions. With reference to FIG. 6D, through thickness fibers 515 are illustrated oriented along curved paths through a fibrous preform 510c, in accordance with various embodiments. FIG. 6D illustrates through thickness fibers 515 oriented in a double helix pattern with through thickness fiber pairs extending in similar rotational directions. In this regard, a first through thickness fiber 515 can be oriented at a first angle with respect to in-plane fibers 516 and a second through thickness fiber 515 can be oriented at a second angle with respect to the in-plane fibers 516. The second angle can be different from the first angle. With combined reference to FIG. 6B, FIG. 6C, and FIG. 6D, in various embodiments, through thickness fibers 515 are interlocking (e.g., the through thickness fibers can all extend in multiple directions (e.g., clockwise and counter clockwise, different radii in the curved paths, or similar)) such that they do overlap or have the propensity to become entangled with one another. Stated differently the through thickness fibers 515 may interlock and or entangle with one another. Disposing through thickness fibers 515 to be interlocking tends to enhance and/or tailor in-plane strength.

Figure 6E:
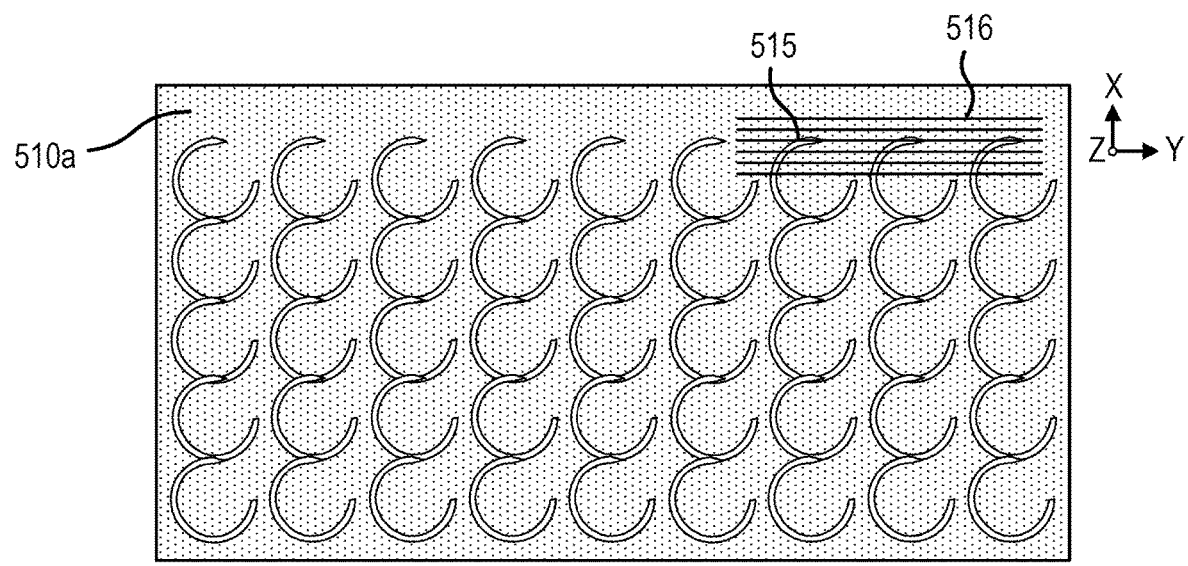
Figure 6F:
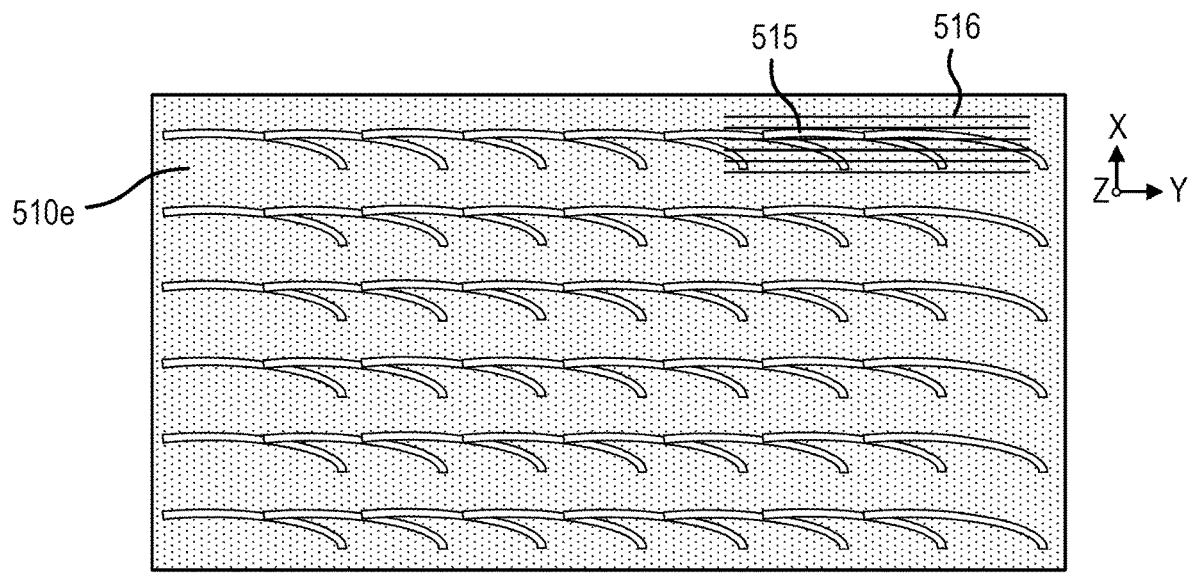

FIG. 6E illustrates a top view of fibrous preform 510a, in accordance with various embodiments. In various embodiments, adjacent through thickness reinforcement fibers 515 can overlap (within the X-Y plane) if desired. FIG. 6F illustrates a top view of fibrous preform 510e with through thickness reinforcement fibers 515 oriented at an angle with respect to in-plane fibers 516. In this regard, in addition to being oriented at an angle with respect to the XY-plane (i.e., at a non-perpendicular angle with respect to the Z-axis), the through thickness reinforcement fibers 515 can be oriented at an angle with respect to the Y-axis. Moreover, the angle of the through thickness reinforcement fibers 515 can vary along a single through thickness reinforcement fiber 515 since the through thickness reinforcement fibers 515 are oriented along a curved path.

Figure 6G:
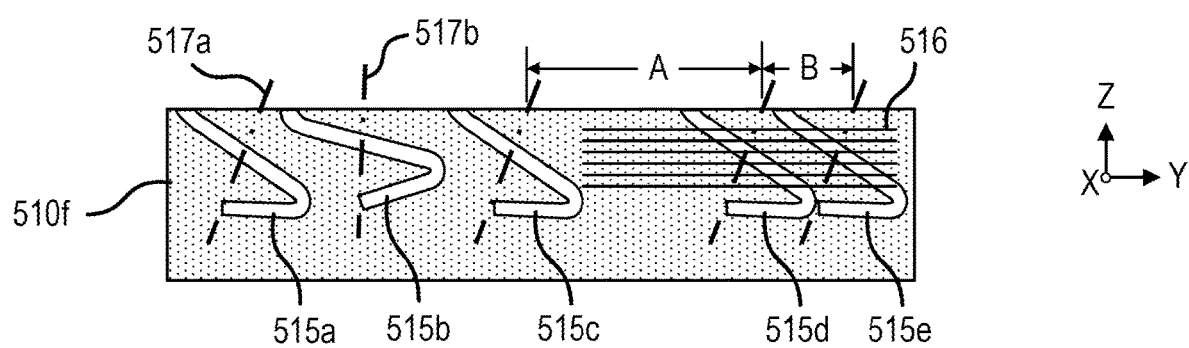

With reference to FIG. 6G, through thickness fibers 515a, 515b, 515c, 515d, and 515e (collectively referred to in the illustrated embodiment as through thickness fibers 515) are illustrated oriented along curved paths through a fibrous preform 510f, in accordance with various embodiments. An axis of rotation 517a during insertion of through thickness fiber 515a may not be normal to the ply stack. An axis of rotation 517b during insertion of through thickness fiber 515b may be normal to the ply stack. In this regard, the angle of rotation during insertion may vary through the needling operation from insertion to insertion of through thickness fibers 515. In various embodiments, the angle of the through thickness fibers 515 with respect to the ply stack (i.e., with respect to the in-plane fibers 516) varies (e.g., increases) along the fibrous preform 510f.

In various embodiments, a density of the through thickness fibers 515 varies (e.g., increases) along the fibrous preform 510f. For example, through thickness fiber 515c is at a distance A from through thickness fiber 515d, whereas through thickness fiber 515d is at a distance B from through thickness fiber 515e, where distance A is greater than distance B. In various embodiments, distance A and distance B can be measured from the axis of rotation of each through thickness fiber 515.

Figure 7:
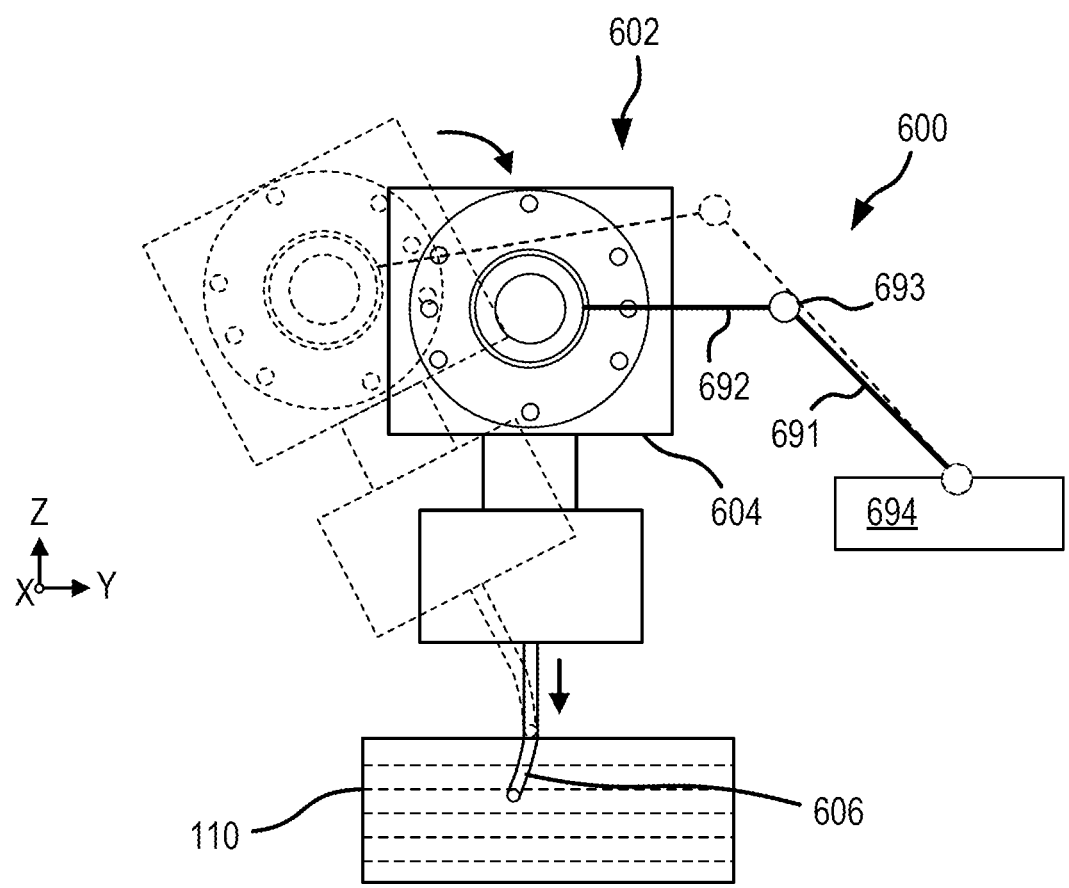
FIG. 7 is a schematic illustration of an exemplary through thickness reinforcement apparatus during a through thickness reinforcement procedure and having a curved needle, in accordance with various embodiments.

With reference to FIG. 7, a through thickness reinforcement apparatus 602 is illustrated comprising an end effector 604 and a needle 606 (also referred to herein as a curved needle) mounted to the end effector 604 for through thickness reinforcement of a fibrous preform 110, in accordance with various embodiments. Apparatus 602 may be similar to apparatus 102 as described herein with respect to FIG. 1, in accordance with various embodiments. Robotic arm 600 can be configured to rotate the end effector 604 about a second axis (e.g., the X-axis) to move a through thickness fiber along a curved path (e.g., see FIG. 2) through fibrous preform 110. As the robotic arm rotates end effector 604 (and needle 606) about the second axis, robotic arm 600 can simultaneously move (e.g., translate) the end effector 604 and/or needle 606 in the negative Z-direction to penetrate fibrous preform 110 along the curved path. In this regard, robotic arm 600 can be configured to articulate needle 606 about one or more axes to orient the through thickness fiber along the desired curved path. In various embodiments, the needle 606 is articulated in the Y-Z plane; though the needle 606 can also be articulated in the X-direction during through thickness reinforcement.

In an exemplary embodiment, robotic arm 600 can comprise a first arm 691 mounted to a base 694 and a second arm 692 mounted to the first arm via a joint 693, whereby the robotic arm 600 is configured to move end effector 604 with respect to fibrous preform 110; though it should be understood that end effector 604 can be articulated using any suitable robotic mechanism (e.g., motors, actuators, etc.) and the scope of the present disclosure is not limited in this regard. Robotic arm can be pneumatically actuated, electrically actuated, hydraulically actuated, or actuated using any other suitable means.

Figure 8:
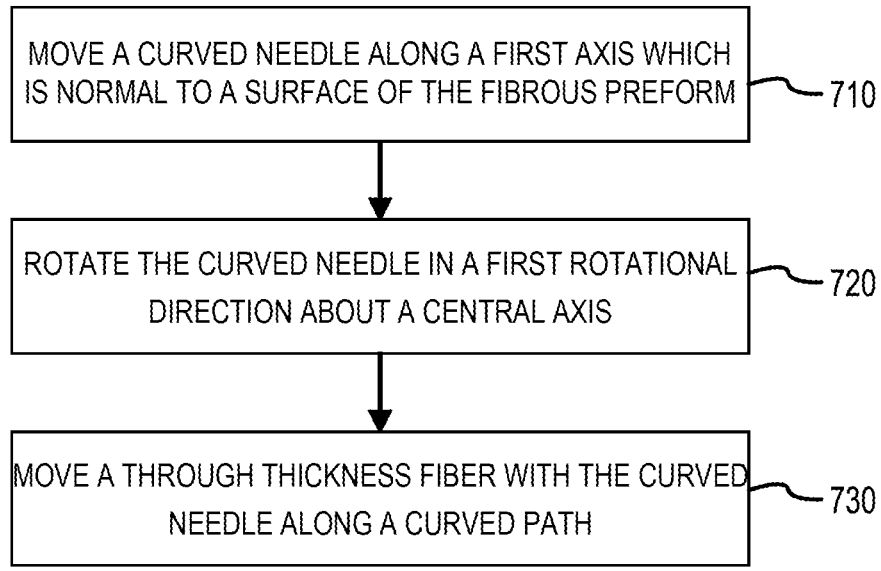
FIG. 8 is a flow chart of a method for performing a through thickness reinforcement process on a fibrous preform, in accordance with various embodiments.

With reference to FIG. 8, a flow chart for a method 700 for through thickness reinforcement is illustrated, in accordance with various embodiments. For ease of description, the method 700 is described below with reference to FIG. 1 and FIG. 7. The method 700 of the present disclosure, however, is not limited to use of the exemplary apparatus 102 of FIG. 1 or the exemplary apparatus 602 of FIG. 7. Method 700 includes moving a curved needle 106 along a first axis (e.g., axis 190) which is normal to a surface (e.g., the top surface) of the fibrous preform 110 (step 710). Step 710 can include linearly translating the curved needle 106 along the axis 190. Method 700 includes rotating the curved needle 106 in a first rotational direction about a central axis (i.e., axis 190) as the curved needle 106 is moved along the first axis (e.g., in the negative Z direction) (step 720). The central axis of step 720 can be coaxial with the first axis of step 710. Method 700 includes moving a through thickness fiber 115 (see FIG. 2) with the curved needle 106 along a curved path 116 (see FIG. 2) from a first ply 117 of the fibrous preform 110 at least partially into a second ply 118 of the fibrous preform 110 (step 730). In this regard, through thickness fiber 115 can be oriented or positioned to extend along a curved path having an in-plane component (i.e., along the X direction and/or the Y direction) and a through thickness component (i.e., along the Z direction).

In various embodiments, method 700 further includes rotating the needle 106 about a second axis (e.g., the X axis in FIG. 7) as the needle 106 is moved along the first axis (e.g., the Z direction in FIG. 7) to move the through thickness fiber along the curved path. In various embodiments, method 700 further includes rotating the needle 106 in a second rotational direction about the central axis (i.e., axis 190) to remove the needle 106 from the fibrous preform 110 (e.g., after the through thickness fiber is displaced). In various embodiments, method 700 further includes activating an electric motor 112 to rotate the curved needle 106.

Figure 9:
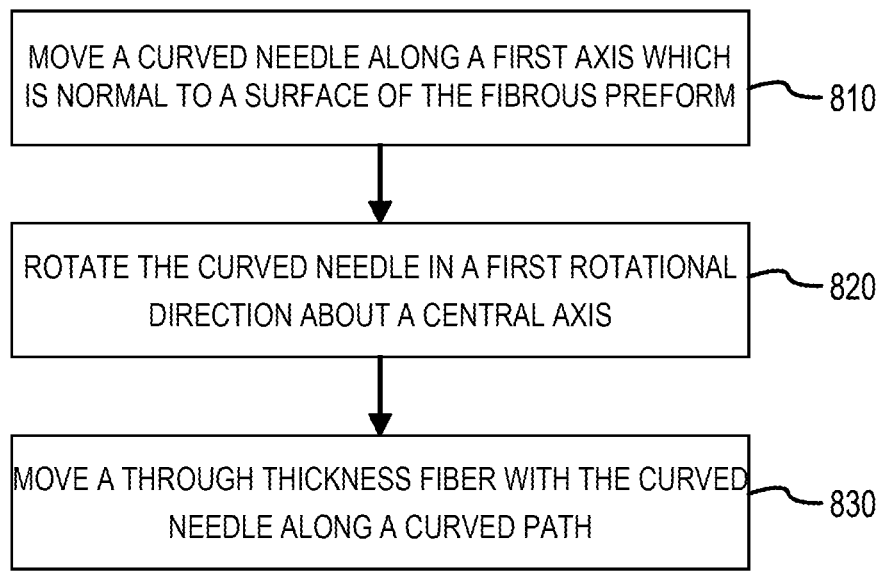
FIG. 9 is a flow chart of a method for performing a through thickness reinforcement process on a fibrous preform, in accordance with various embodiments.

With reference to FIG. 9, a flow chart for a method 800 for through thickness reinforcement is illustrated, in accordance with various embodiments. For case of description, the method 800 is described below with reference to FIG. 1, FIG. 2, and FIG. 7. The method 800 of the present disclosure, however, is not limited to use of the exemplary apparatus 102 of FIG. 1 or the exemplary apparatus 602 of FIG. 7. Method 800 includes moving a needle 106 along a curved path 116 (step 810). Method 800 includes penetrating a first ply 117 of the fibrous preform 110 and a second ply 118 of the fibrous preform 110 with the needle 106 as the needle 106 is moved along the curved path 116 (step 820). Method 800 includes moving a first through thickness fiber 115 with the needle 106 along the curved path 116 from the first ply 117 of the fibrous preform 110 at least partially into the second ply 118 of the fibrous preform 110.

In various embodiments, method 800 further includes rotating the needle 106 about a central axis 190 of the needle 106 to move the needle 106 along the curved path 116. In various embodiments, method 800 further includes moving a second through thickness fiber with the needle 106 along a second curved path from the first ply 117 of the fibrous preform 110 at least partially into the second ply 118 of the fibrous preform 110. In various embodiments, method 800 further includes interlocking the second through thickness fiber with the first through thickness fiber (e.g., see FIG. 6B through FIG. 6D).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is intended to invoke 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An apparatus for through thickness reinforcement of a fibrous preform, the apparatus comprising:
   an end effector; and
   a curved needle extending from the end effector in a first direction, wherein the curved needle is configured to rotate about a first axis parallel to the first direction;
   wherein the end effector is configured to move the curved needle in the first direction as the curved needle rotates about the first axis to move a through thickness fiber along a curved path from a first ply of the fibrous preform at least partially into a second ply of the fibrous preform.

2. The apparatus of claim 1, wherein the curved needle is configured to rotate about the first axis in a first rotational direction while the through thickness fiber is moved along the curved path, and the curved needle is configured to rotate about the first axis in a second rotational direction to remove the curved needle from the fibrous preform, wherein the first rotational direction is opposite the second rotational direction.

3. The apparatus of claim 1, further comprising an electric motor mounted to the end effector and configured to rotate the needle about the first axis parallel to the first direction.

4. The apparatus of claim 1, further comprising a robotic arm, wherein the end effector is mounted to the robotic arm, and the robotic arm is configured to rotate the end effector about a second axis to move the through thickness fiber along the curved path.

5. The apparatus of claim 4, wherein the second axis is perpendicular to the first axis.

6. The apparatus of claim 1, wherein the curved needle comprises a barb on a curved portion of the curved needle.

7. The apparatus of claim 1, wherein the curved needle comprises a linear portion extending from the end effector and a curved portion extending from the linear portion and defining a tip of the curved needle.

8. The apparatus of claim 1, wherein the curved needle comprises a linear portion extending from the end effector and a helical portion extending from the linear portion and defining a tip of the curved needle.

9. The apparatus of claim 1, wherein the curved needle comprises a linear portion extending from the end effector and a curved portion extending from the linear portion and defining a tip of the curved needle.

* * * * *